United States Patent
Humfeld et al.

(10) Patent No.: US 10,901,228 B2
(45) Date of Patent: Jan. 26, 2021

(54) CAVITY WITH CURVED BEAM REPLICATOR AND METHOD OF DETERMINING A CHARACTERISTIC OF A MEDIUM THEREIN

(71) Applicant: THE BOEING COMPANY, Chicago, IL (US)

(72) Inventors: Keith Daniel Humfeld, Federal Way, WA (US); Morteza Safai, Newcastle, WA (US)

(73) Assignee: THE BOEING COMPANY, Chicago, IL (US)

(*) Notice: Subject to any disclaimer, the term of this patent is extended or adjusted under 35 U.S.C. 154(b) by 306 days.

(21) Appl. No.: 15/635,101

(22) Filed: Jun. 27, 2017

(65) Prior Publication Data
US 2018/0373050 A1 Dec. 27, 2018

(51) Int. Cl.
| | | |
|---|---|---|
| *G01N 21/31* | (2006.01) | |
| *G01N 21/77* | (2006.01) | |
| *G01N 15/14* | (2006.01) | |
| *G02B 27/12* | (2006.01) | |
| *G02B 27/10* | (2006.01) | |
| *G01N 15/02* | (2006.01) | |
| *G01N 15/00* | (2006.01) | |

(52) U.S. Cl.
CPC ....... *G02B 27/126* (2013.01); *G01N 15/0227* (2013.01); *G01N 15/1434* (2013.01); *G01N 21/31* (2013.01); *G01N 21/77* (2013.01); *G02B 27/106* (2013.01); *G01N 2015/0046* (2013.01); *G01N 2015/0053* (2013.01); *G01N 2015/1445* (2013.01); *G01N 2015/1447* (2013.01); *G01N 2201/06113* (2013.01)

(58) Field of Classification Search
CPC ........ G02B 27/12; G02B 27/10; G01N 15/14; G01N 21/31; G01N 21/77
USPC .............. 436/165; 422/82.05, 82.08–82.09
See application file for complete search history.

(56) References Cited

U.S. PATENT DOCUMENTS

| | | | | | |
|---|---|---|---|---|---|
| 2,140,972 | A | * | 12/1938 | Rylsky ................ | G01D 11/28 362/23.15 |
| 2,221,152 | A | * | 11/1940 | Rylsky ................ | G01C 9/32 33/348.2 |
| 2,259,910 | A | * | 10/1941 | Rylsky ................ | G01D 11/28 362/23.15 |
| 2,549,574 | A | * | 4/1951 | Condiff ............... | G01N 21/64 356/246 |
| 2,775,159 | A | * | 12/1956 | Frommer ............. | H03K 21/00 356/339 |

(Continued)

*Primary Examiner* — Arlen Soderquist
(74) *Attorney, Agent, or Firm* — Moore Intellectual Property Law, PLLC (57) ABSTRACT

A curved beam replicator includes a body having a first surface and a second surface. The second surface defines at least a portion of a cavity. The first surface is configured to cause light entering the body from another medium to be refracted at a first angle such that the light strikes the second surface at a second angle. The second surface is configured to cause a first portion of the light striking the second surface to pass through the second surface and be refracted into a medium in the cavity and to cause a second portion of the light striking the second surface to be reflected toward the first surface at a third angle. The third angle such that the second portion of the light is totally internally reflected by the first surface.

20 Claims, 6 Drawing Sheets

(56) References Cited

U.S. PATENT DOCUMENTS

| | | | | |
|---|---|---|---|---|
| 3,027,457 A * | 3/1962 | Mouly | G01B 11/08 | 250/372 |
| 3,040,458 A * | 6/1962 | Mathews | G06M 1/22 | 362/23.01 |
| 3,220,299 A * | 11/1965 | Reisinger | G02B 27/34 | 356/247 |
| 3,349,211 A * | 10/1967 | Lien | H01H 19/001 | 200/316 |
| 3,349,234 A * | 10/1967 | Schwarz | G02B 6/0021 | 116/287 |
| 3,418,053 A * | 12/1968 | Pelavin | G01N 21/05 | 356/246 |
| 3,422,667 A * | 1/1969 | Hrdina | G01N 21/85 | 356/136 |
| 3,446,916 A * | 5/1969 | Kegelman | G02B 27/01 | 348/115 |
| 3,518,009 A * | 6/1970 | Shamos | G01N 21/05 | 356/410 |
| 3,535,023 A * | 10/1970 | Azuma | G02B 3/00 | 356/246 |
| 3,591,287 A * | 7/1971 | Hannis | G01N 21/552 | 356/51 |
| 3,636,360 A * | 1/1972 | Oishi | G01F 23/2921 | 250/577 |
| 3,647,304 A * | 3/1972 | Emmel | G01N 21/03 | 356/246 |
| 3,683,196 A * | 8/1972 | Obenhaus | G01F 23/2927 | 250/227.11 |
| 3,733,130 A * | 5/1973 | Young | G01N 21/8507 | 356/410 |
| 3,849,654 A * | 11/1974 | Malvin | G01N 21/05 | 250/363.01 |
| 3,865,548 A * | 2/1975 | Padawer | A61B 5/145 | 436/165 |
| 3,898,046 A * | 8/1975 | Ikeda | B01L 3/50825 | 422/550 |
| 3,908,441 A * | 9/1975 | Virloget | G01F 23/2921 | 73/54.08 |
| 3,982,816 A * | 9/1976 | Watkins | G01B 11/08 | 356/73.1 |
| 3,984,154 A * | 10/1976 | Chin | G01C 15/004 | 359/731 |
| 4,027,977 A * | 6/1977 | Frazee, Jr. | G01B 11/08 | 356/73.1 |
| 4,037,974 A * | 7/1977 | Fletcher | G01N 21/03 | 356/246 |
| 4,101,276 A * | 7/1978 | Anderson | G01N 21/6428 | 436/536 |
| 4,203,673 A * | 5/1980 | Buckson | G01N 21/952 | 209/587 |
| 4,242,194 A * | 12/1980 | Steiner | G01N 15/04 | 204/645 |
| 4,250,394 A * | 2/1981 | O'Connor | G01N 33/54313 | 250/574 |
| 4,264,206 A * | 4/1981 | Hattori | G01N 15/0205 | 250/574 |
| 4,265,538 A * | 5/1981 | Wertheimer | G01N 21/51 | 250/576 |
| 4,286,876 A * | 9/1981 | Hogg | G01N 21/47 | 250/574 |
| 4,305,665 A * | 12/1981 | Achter | G01N 21/51 | 250/574 |
| 4,344,429 A * | 8/1982 | Gupton | A61M 5/365 | 250/204 |
| 4,366,384 A * | 12/1982 | Jensen | A61M 5/365 | 250/575 |
| 4,451,434 A * | 5/1984 | Hart | G01N 21/648 | 356/246 |
| 4,477,186 A * | 10/1984 | Carlson | G01N 21/05 | 356/246 |
| 4,560,269 A * | 12/1985 | Baldszun | G01N 21/0303 | 356/246 |
| 4,576,436 A * | 3/1986 | Daniel | F21S 8/04 | 359/591 |
| 4,577,970 A * | 3/1986 | Meserol | G01N 21/0303 | 356/246 |
| 4,591,268 A * | 5/1986 | Lew | G01N 21/251 | 250/432 R |
| 4,616,927 A * | 10/1986 | Phillips | G01N 21/03 | 356/338 |
| 4,643,570 A * | 2/1987 | Machler | G01N 21/05 | 250/576 |
| 4,652,429 A * | 3/1987 | Konrad | B65D 51/002 | 215/249 |
| 4,654,535 A * | 3/1987 | Wolske | G01F 23/292 | 250/577 |
| 4,665,391 A * | 5/1987 | Spani | G01F 23/2921 | 250/577 |
| 4,805,984 A * | 2/1989 | Cobb, Jr. | G02B 5/12 | 385/133 |
| 4,857,050 A * | 8/1989 | Lentz | G01F 23/2921 | 604/67 |
| 4,859,861 A * | 8/1989 | Mersch | G01B 11/255 | 250/559.22 |
| 4,859,864 A * | 8/1989 | Smith | A61M 5/365 | 250/577 |
| 4,886,357 A * | 12/1989 | Harrick | G01N 21/552 | 356/300 |
| 4,906,094 A * | 3/1990 | Ashida | G01N 15/0205 | 356/246 |
| 4,912,529 A * | 3/1990 | Allen | G01N 21/255 | 356/237.1 |
| 4,925,300 A * | 5/1990 | Rachlin | A61B 5/1172 | 356/71 |
| 4,952,055 A * | 8/1990 | Wyatt | G01N 21/4133 | 356/128 |
| 4,962,021 A * | 10/1990 | Meserol | G01N 33/559 | 422/423 |
| 4,989,452 A * | 2/1991 | Toon | G01F 23/292 | 73/293 |
| 5,008,556 A * | 4/1991 | Mersch | G01B 11/14 | 250/559.09 |
| 5,033,058 A * | 7/1991 | Cabaret | H01S 3/042 | 372/35 |
| 5,118,954 A * | 6/1992 | Grosso | G01B 11/105 | 250/559.24 |
| 5,120,979 A * | 6/1992 | Mersch | G01N 21/51 | 250/574 |
| 5,274,227 A * | 12/1993 | Moring | G01N 21/05 | 250/227.25 |
| 5,305,071 A * | 4/1994 | Wyatt | G01N 21/4133 | 356/128 |
| 5,312,535 A * | 5/1994 | Waska | G01N 27/44721 | 204/603 |
| 5,466,946 A * | 11/1995 | Kleinschmitt | G01N 21/85 | 250/577 |
| 5,525,466 A * | 6/1996 | Slovacek | G01N 21/648 | 435/6.11 |
| 5,538,900 A * | 7/1996 | Rooney | G01N 21/03 | 422/402 |
| 5,553,616 A * | 9/1996 | Ham | A61B 5/14558 | 600/316 |
| 5,636,017 A * | 6/1997 | Bruno | G01N 21/05 | 356/246 |
| 5,644,402 A * | 7/1997 | Chevallet | A61M 1/1692 | 250/559.4 |
| 5,814,279 A * | 9/1998 | Biesel | B04B 5/0407 | 356/428 |
| 5,858,800 A * | 1/1999 | Shigemori | G01N 21/6428 | 356/244 |
| 5,897,201 A * | 4/1999 | Simon | G02B 6/0068 | 362/268 |
| 5,910,449 A * | 6/1999 | Rooney | G01N 21/293 | 422/504 |
| 5,960,129 A * | 9/1999 | Kleinschmitt | G01N 21/41 | 250/227.15 |
| 6,052,184 A * | 4/2000 | Reed | G01N 15/0211 | 356/337 |

(56) References Cited

U.S. PATENT DOCUMENTS

| | | | | |
|---|---|---|---|---|
| 6,100,541 A * | 8/2000 | Nagle | B01L 3/5027 | 204/603 |
| 6,108,083 A * | 8/2000 | Machler | G01J 3/02 | 356/246 |
| 6,128,075 A * | 10/2000 | Brierley | G01J 3/45 | 250/340 |
| 6,180,314 B1 * | 1/2001 | Berndt | G01N 1/2813 | 422/401 |
| 6,277,330 B1 * | 8/2001 | Liu | G01N 21/552 | 422/82.05 |
| 6,285,451 B1 * | 9/2001 | Herron | G01B 11/06 | 250/559.27 |
| 6,406,669 B1 * | 6/2002 | Duan | G01N 21/783 | 422/82.09 |
| 6,426,045 B1 * | 7/2002 | Jeng | G01N 21/05 | 356/246 |
| 6,480,282 B1 * | 11/2002 | Chinowsky | G01N 21/0303 | 356/246 |
| 6,481,860 B1 * | 11/2002 | Chang | H04N 1/03 | 250/227.2 |
| 6,535,537 B1 * | 3/2003 | Kinoshita | H01S 5/041 | 372/50.11 |
| 7,130,060 B2 * | 10/2006 | Bornhop | G01N 21/45 | 356/517 |
| 8,086,387 B2 | 12/2011 | Bradley et al. | | |
| 8,256,918 B2 * | 9/2012 | Chaves | G02B 6/0096 | 362/216 |
| 8,502,989 B1 | 8/2013 | Rossbach | | |
| 2003/0030790 A1 * | 2/2003 | Rakucewicz | G01N 21/431 | 356/128 |
| 2003/0053229 A1 * | 3/2003 | Chang | H04N 1/03 | 359/867 |
| 2005/0110989 A1 * | 5/2005 | Schermer | G01N 21/253 | 356/246 |
| 2009/0237951 A1 * | 9/2009 | Zwick | G02B 6/0011 | 362/516 |
| 2010/0103421 A1 * | 4/2010 | Johansen | G01N 21/553 | 356/367 |
| 2013/0100433 A1 * | 4/2013 | Frose | G01N 21/51 | 356/36 |
| 2014/0356937 A1 * | 12/2014 | Boudreau | G01N 15/1436 | 435/288.7 |
| 2015/0260992 A1 * | 9/2015 | Luttmann | G02B 27/0172 | 359/631 |
| 2018/0356336 A1 * | 12/2018 | Bland | G01N 21/31 | |

* cited by examiner

CAVITY WITH CURVED BEAM REPLICATOR AND METHOD OF DETERMINING A CHARACTERISTIC OF A MEDIUM THEREIN

FIELD OF THE DISCLOSURE

The present disclosure relates to a curved beam replicator.

BACKGROUND

Optical systems are used in a wide variety of applications, such as sensor systems and communications systems. In some optical systems, an optical signal is divided into multiple separate signals. For example, a beam emitted by a laser may be divided into two sub-beam beams, i.e., portions of the original beam, using a beam splitter. A beam splitter that divides an optical signal into multiple sub-beams can also be referred to as a beam replicator.

SUMMARY

According to a particular implementation of the present disclosure, a curved beam replicator includes a body having a first surface and a second surface. The second surface defines at least a portion of a cavity. The first surface is configured to cause light entering the body from another medium to be refracted at a first angle such that the light strikes the second surface at a second angle. The second surface is configured to cause a first portion of the light striking the second surface to pass through the second surface and be refracted into a medium in the cavity and to cause a second portion of the light striking the second surface to be reflected toward the first surface at a third angle. The third angle is such that the second portion of the light is totally internally reflected by the first surface.

A system includes a curved beam replicator including a body having a first surface and a second surface. The second defines at least a portion of a cavity. The system also includes an optical signal generator to direct an optical signal toward the curved beam replicator and a plurality of beam detectors. The plurality of beam detectors includes a first beam detector positioned to detect a first portion of the optical signal that passes through the beam replicator and the cavity from the optical signal generator. The plurality of beam detectors also includes a second beam detector positioned to detect a second portion of the optical signal that is reflected by the second surface of the body toward the first surface of the body and internally reflected by the first surface.

According to another aspect of the present disclosure, a method includes causing an optical signal to be directed toward a curved beam replicator. The curved beam replicator includes a body having a first surface and a second surface. The second surface defines at least a portion of a cavity. The body is configured to divide the optical signal into multiple portions. The method also includes receiving, at a computing device, first sensor data indicating a first measured value of a first portion of the optical signal. The first measured value is indicative of interaction between the first portion of the optical signal and a material within the cavity. The method further includes receiving, at a computing device, second sensor data indicating a second measured value of a second portion of the optical signal. The second measured value is indicative of interaction between the second portion of the optical signal and the material within the cavity. The method further includes determining, by the computing device, at least one characteristic of the material within the cavity based on the first measured value and the second measured value.

DETAILED DESCRIPTION

Particular embodiments of the present disclosure are described below with reference to the drawings. In the description, common features are designated by common reference numbers throughout the drawings.

The figures and the following description illustrate specific illustrative embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
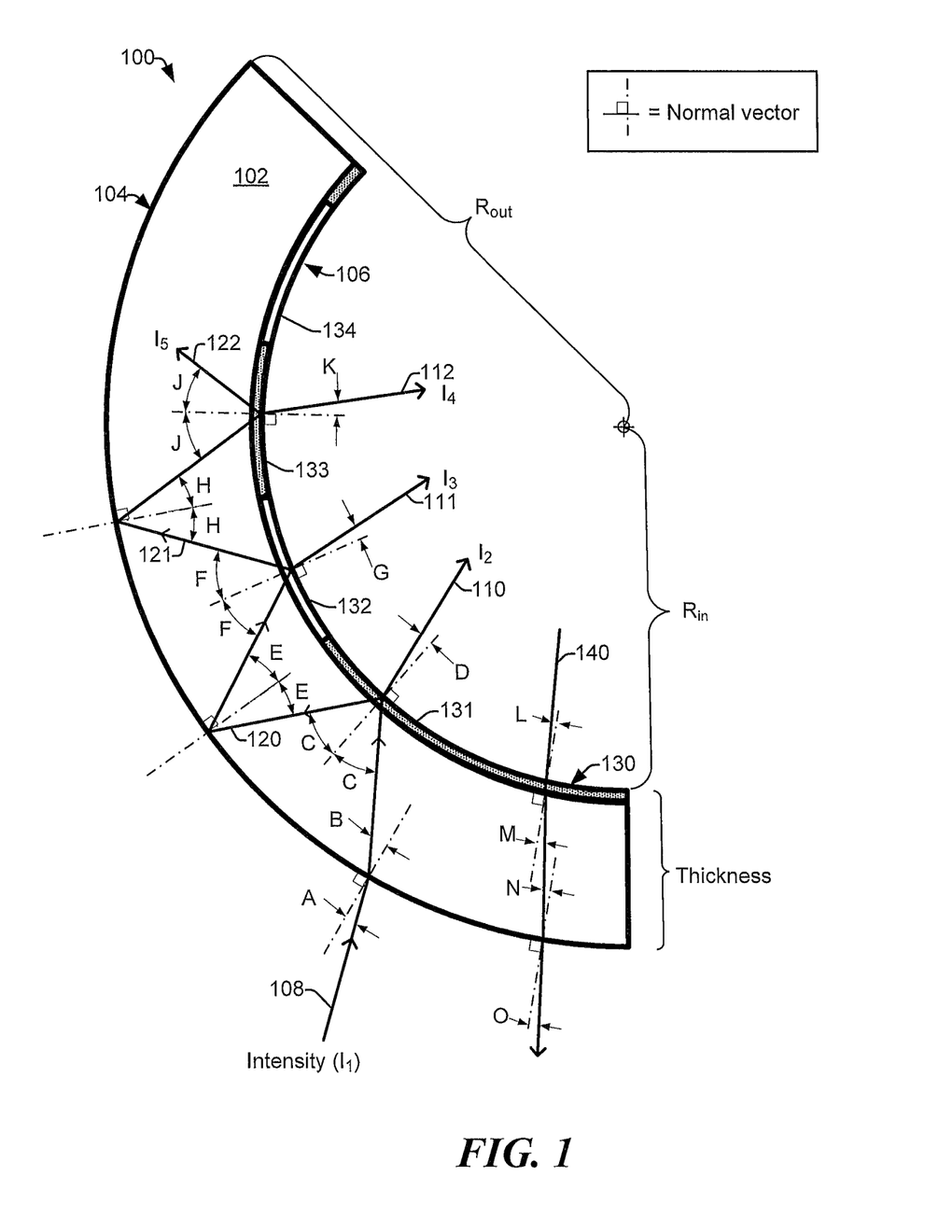
FIG. 1 is a diagram of a particular example of a curved beam replicator.

FIG. 1 is a diagram of a particular example of a curved beam replicator 100. The curved beam replicator 100 includes a substantially optically transparent body 102 having a first surface 104 and a second surface 106. The curved beam replicator 100 is configured to divide an optical signal (e.g., a beam 108) into multiple portions (e.g., sub-beams 110-112), as described further below. As a result of the curved geometry of the curved beam replicator 100, the sub-beams 110-112 are oriented in non-parallel directions. For ease of description and illustration, the optical signal is generally described and represented herein as a beam (e.g., coherent light from a laser source); however, the optical signal need not be a beam in this sense for the curved beam replicator 100 to function properly.

In FIG. 1, the body 102 of the curved beam replicator 100 is curved such that the first surface 104 has a first radius of curvature ($R_{out}$) and the second surface 106 has a second radius of curvature ($R_{in}$), which is less than $R_{out}$ by an amount corresponding to the thickness of the body 102. In FIG. 1, the body 102 has a substantially uniform thickness and substantially uniform curvature (e.g., the body 102 in FIG. 1 has a shape that corresponds to a section of a uniform circular cylinder); however, in other implementations, the geometry of the curved beam replicator 100 may be non-uniform. For example, the radius of curvature of the first surface 104, of the second surface 106, or both, may vary along the body 102. To illustrate, the radius of curvature ($R_{in}$) of the second surface 106 may have a first value (e.g., $R_{in}(1)$) at a first end of the body 102 and may have a second value (e.g., $R_{in}(2)$) at a second end of the body 102, where $R_{in}(1)$ is not equal to $R_{in}(2)$. In this example, the radius of curvature of the first surface 104 may be uniform along the body 102 (such that the thickness of the body 102 is different along the body 102). In another illustrative example, the radius of curvature ($R_{out}$) of the first surface 104 may have a first value (e.g., $R_{out}(1)$) at a first end of the body 102 and a second value (e.g., $R_{out}(2)$) at a second end of the body 102, where $R_{out}(1)$ is not equal to $R_{out}(2)$. In yet another example, the radius of curvature of the first surface 104 and the radius of curvature of the second surface 106 may both be different along the body 102 (such that the thickness of the body 102 varies along the body 102 or such that the thickness of the body 102 is uniform along the body 102).

The second surface 106 has optical properties that vary along the body 102. For example, in FIG. 1, the second surface 106 may include a surface layer 130 that includes multiple regions 131-134. In this example, the regions 131-134 have different optical properties which cause the reflective and refractive properties of the second surface 106 to be different at different locations along the second surface 106. To illustrate, the surface layer 130 in a first region 131 may internally reflect more light than the surface layer 130 in a second region 132. Likewise, the surface layer 130 in the second region 132 may internally reflect more light than the surface layer 130 in a third region 133, the surface layer 130 in the third region 133 may internally reflect more light than the surface layer 130 in a fourth region 134, and so forth. In a particular implementation, the surface layer 130 includes a reflective material (e.g., silver) coupled to the second surface 106. The reflective material may be applied using a process (such as sputtering) that enables fine control of a quantity (or a surface density) of the reflective material applied in each region 131-134. By finely controlling the quantity (or surface density) of the reflective material, the reflective properties of each of the regions 131-134 can be tuned to achieved graduated or continuously variable reflective and refractive properties. In other implementations, the optical properties of the second surface 106 can be varied along the body 102 in another manner, such as by selective doping a material used to form the body 102 to achieve variable refractive indices within the body 102 adjacent to the second surface 106, or by tuning the radius of curvature ($R_{in}$) of the second surface 106 to achieve particular incidence angles of light striking the second surface 106 as a result of internal reflection from the first surface 104.

According to principles of Snell's Law, light striking the curved beam replicator 100 from another medium, such as air, is refracted or reflected at an angle that depends on an angle of incidence of the light and refractive indices of the body 102 and the other medium. In FIG. 1, refractive and reflective properties of the curved beam replicator 100 are illustrated by a path of the beam 108. The beam 108' is incident on the first surface 104 of the curved beam replicator 100 at an incidence angle A (relative to a normal of the first surface 104). In the example illustrated in FIG. 1, the incidence angle A is selected such that the beam 108 passes into the body 102 and is refracted at a refraction angle B. For example, the incidence angle A is less than or equal to a critical angle associated with an interface formed by the body 102 and a medium external to the body 102 and in contact with the first surface 104. The refraction angle B causes the beam to strike the first region 131 of the second surface 106 at an incidence angle C.

The incidence angle C is such that a first portion 120 of the beam 108 is reflected by the first region 131 of the second surface 106 at the reflection angle C, and another portion of the beam 108 (e.g., the sub-beam 110) passes through the second surface 106 and is refracted at a refraction angle D. The reflection angle C and the thickness of the body 102 are such that the first portion 120 strikes the first surface 104 at an incidence angle E and is substantially completely internally reflected at a reflection angle E. For example, the incidence angle E is greater than or equal to the critical angle associated with the interface formed by the body 102 and the medium external to the body 102 and in contact with the first surface 104. The reflection angle E and the thickness of the body 102 are such that the internally reflected first portion 120 strikes the second region 132 of the second surface 106 at an incidence angle F.

The incidence angle F is such that the first portion 120 of the beam 108 is divided into a second portion 121 of the beam 108 and the sub-beam 111. The sub-beam 111 passes through the second surface 106 and is refracted at a refraction angle G. The second portion 121 is reflected by the second region 132 of the second surface 106 at the reflection angle F. The reflection angle F and the thickness of the body 102 are such that the second portion 121 strikes the first surface 104 at an incidence angle H and is substantially completely internally reflected at a reflection angle H. The reflection angle H and the thickness of the body 102 are such that the internally reflected first portion 120 strikes the third region 133 of the second surface 106 at an incidence angle J.

The incidence angle J is such that the second portion 121 of the beam 108 is divided into a third portion 122 of the beam 108 and the sub-beam 112. The sub-beam 112 passes through the second surface 106 and is refracted at a refraction angle K. The third portion 122 is reflected by the third region 133 of the second surface 106 at the reflection angle J. The third portion 122 may be internally reflected by the first surface 104 to continue the reflection and refraction described above such that additional sub-beams are formed. Alternatively, the third region 133 of the second surface 106 or another region of the second surface 106 may allow an internally reflected portion of the beam to be substantially fully refracted (e.g., without further dividing the beam) to generate a final sub-beam.

In a particular implementation, the variable optical properties of the second surface 106 (e.g., the properties of the regions 131-134 of the layer 130) are selected such that the sub-beams 110-112 have a known or expected intensity relationship to the beam 108. For example, in FIG. 1, the beam 108 has an intensity $I_1$ (corresponding to 100% of power of the beam 108), the first sub-beam 110 has an intensity $I_2$, the second sub-beam 111 has an intensity $I_3$, the third sub-beam 112 has an intensity $I_4$, and the third portion 122 has an intensity $I_5$. Ignoring losses, $I_1$ is equal to a sum of $I_2$, $I_3$, $I_4$ and $I_5$. In some implementations, by finely controlling the optical properties of the layer 130, $I_2$, $I_3$ and $I_4$ may be approximately equal. In such implementations, the intensity of each sub-beam depends on the number of sub-beams and the intensity $I_1$ of the beam 108. For example, the intensity of each sub-beam may be approximately equal to the intensity $I_1$ of the beam 108 divided by the number of sub-beams.

Figure 2:
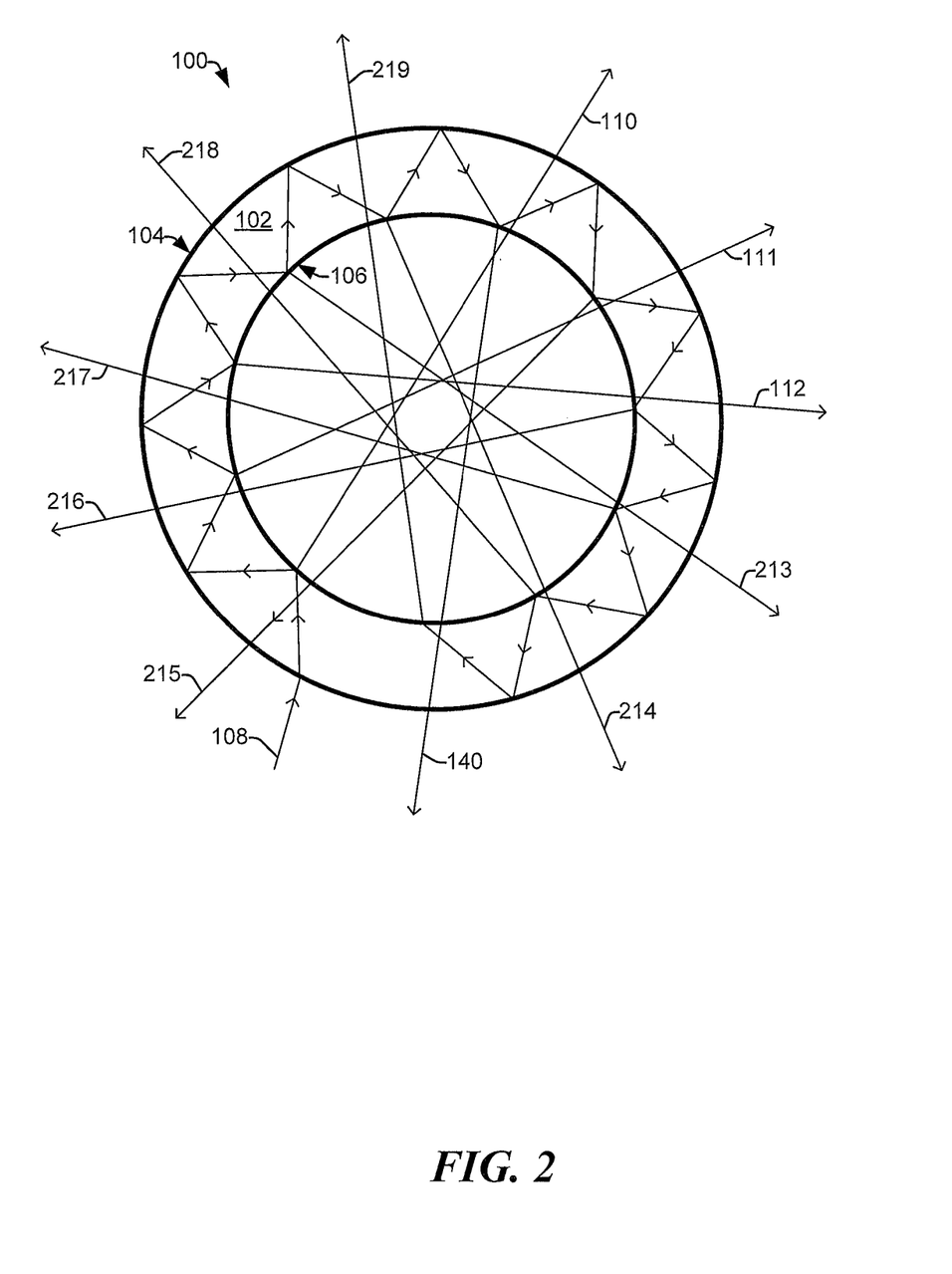
FIG. 2 is a diagram of another particular example of the curved beam replicator of FIG. 1.

FIG. 1 also illustrates a second beam 140 that strikes the second surface 106 at an incidence angle L. The incidence angle L is such that the second beam 140 passes through and is refracted by the second surface 106 at a refraction angle M. The refraction angle M is such that the second beam 140 strikes the first surface at an incidence angle N. The incidence angle N is such that the second beam 140 passes through and is refracted by the first surface at a refraction angle O. Thus, a detector positioned based on the refraction angle O can detect the second beam 140. In a particular implementation, as illustrated in FIG. 2, the second beam 140 may correspond to a sub-beam generated by a portion of the curved beam replicator 100 that is not illustrated in FIG. 1. In this implementation, the sub-beams 110-112 may strike a portion of the second surface 106 and pass through the body 102 to enable detection of the sub-beams, as described further below.

Figure 3:
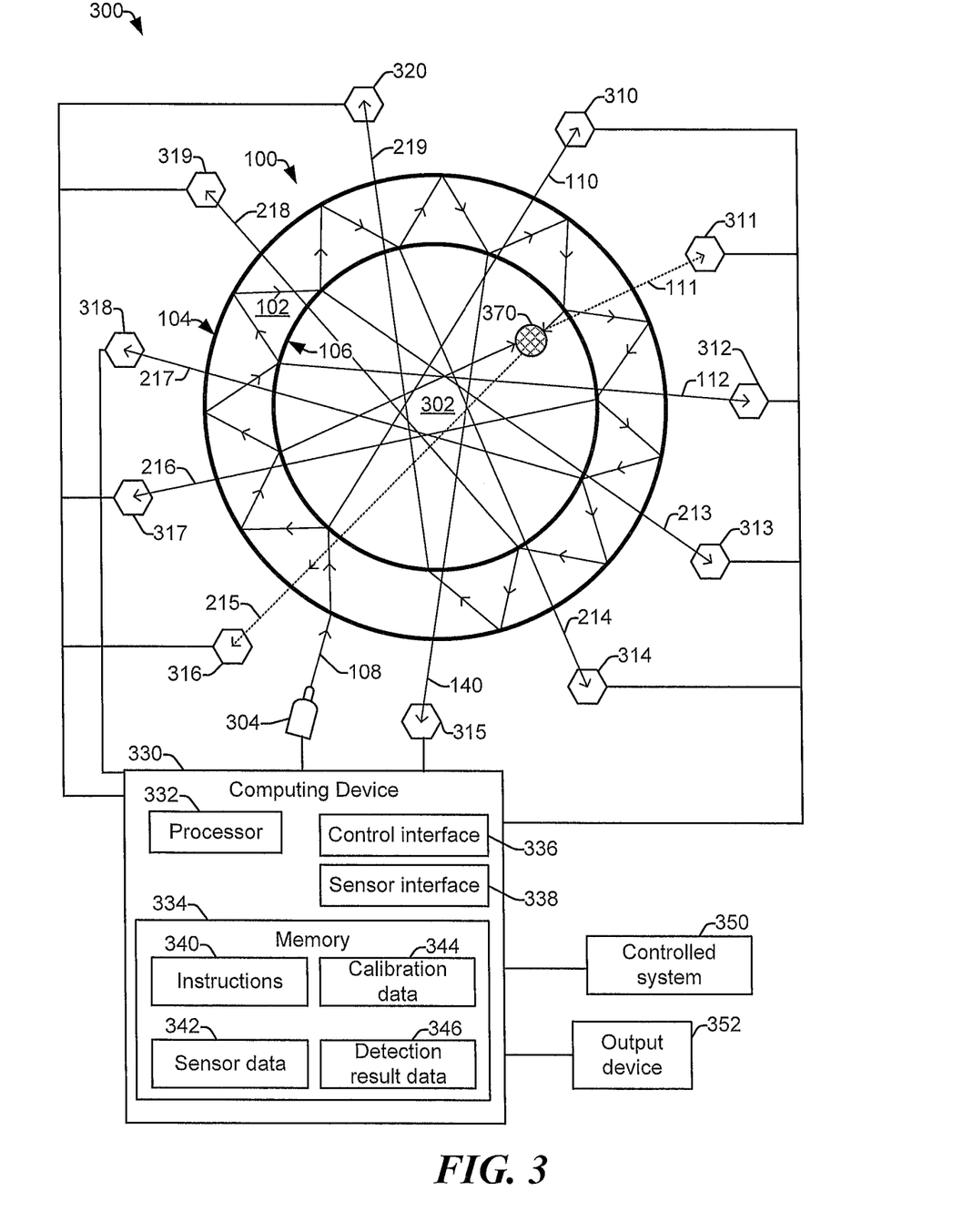
FIG. 3 is a diagram of a sensor system that includes the curved beam replicator of FIG. 1.
Figure 4:
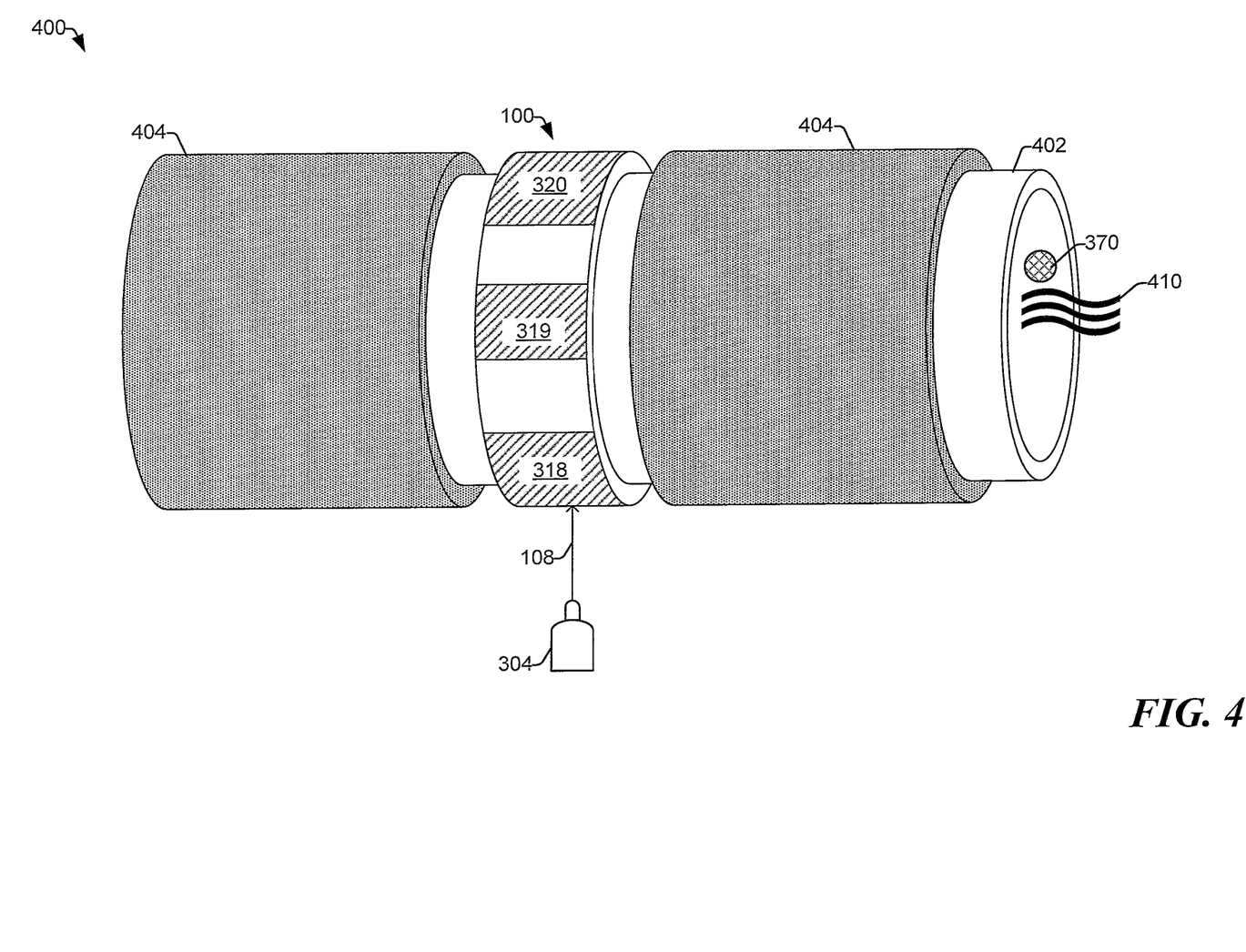
FIG. 4 is a diagram of another system that includes the curved beam replicator of FIG. 1.

Although FIG. 1 illustrates the curved beam replicator 100 as extending through approximately 135 degrees of arc, in other implementations, the curved beam replicator 100 extends through more than 135 degrees of arc, such as through 360 degrees of arc as illustrated in FIGS. 2-4. In yet other implementations, the curved beam replicator 100 extends through less than 135 degrees of arc. Further, although FIG. 1 illustrates three sub-beams 110-112 generated by the curve beam replicator 100, in other implementations, the curved beam replicator may be configured to generate more than or fewer than three sub-beams. Additionally, although FIG. 1 illustrates a single beam 108 striking the first surface 104 to generate the sub-beams 110-112, in other implementations, more than one optical signal source (e.g. laser device) may be used to generate more than one beam directed toward the first surface to generate sub-beams.

Note that unlike a simple flat beam replicator or beam splitter, the curvature of the surface of the curved beam replicator 100 introduces considerable challenges. For example, if the incidence angle A at which the beam 108 strikes the first surface 104 is too large, the beam 108 may strike the second surface 106 at an angle that is greater than a critical angle of the interface between the body 102 and a medium in contact with the second surface 106, in which case the beam 108 will be totally internally reflected, without generating the first sub-beam 110. Further, even if the incidence angle A is as illustrated in FIG. 1 and the second surface 106 divides the beam 108 into the first sub-beam 110 and the first portion 120, if the thickness of the body 102 is too small, the incidence angle E may be so large that the reflection angle E causes the first portion 120 to miss the second surface 106. Alternately, if the thickness of the body 102 is too large, the incidence angle E may be less than the critical angle at the first surface 104, resulting in the first portion passing through the first surface 104 rather than being internally reflected. Thus, unlike flat beam replicators, geometry of the curved beam replicator 100 (including the radii of curvature of the surfaces 104, 106 and the thickness of the body 102), optical properties of the body (including a bulk refractive index of the body and refractive and reflective properties of the second surface 106), and the incidence angle A are all carefully designed to divide the beam 108 into multiple sub-beams.

Thus, based on the material properties of the body 102, the geometry of the body 102, the incidence angle A of the beam 108, and the variable reflective properties of the second surface 106, the curved beam replicator 100 is configured to divide the beam 108 into multiple sub-beams 110-112. The sub-beams 110-112 can be used for a variety of communications or sensing operations. For example, as described further with reference to FIG. 3, the sub-beams may be used to sense changes in optical properties of a medium adjacent to the second surface 106.

FIG. 2 illustrates an example of the curved beam replicator 100 in which the body 102 defines a complete ring (e.g., 360 degrees of arc). FIG. 2 also illustrates the beam 108 incident on the body 102 and forming the sub-beams 110-112. The various angles of the beam and sub-beams are omitted to simplify the illustration; however, the curved beam replicator 100 is configured to reflect and refract the beam 108 as described with reference to FIG. 1 except that beam 108 propagates through more of the body 102 and forms more sub-beams in FIG. 2. For example, in FIG. 2, the curved beam replicator 100 divides the beam 108 into eleven sub-beams, including the sub-beams 110-112 and the second beam 140 of FIG. 1, and further including sub-beams 213-219. The sub-beams 110-112, 140, and 213-219 project through a cavity defined by the second surface 106 of the body 102 and through the body 102 into an area around the body 102. As described above, the sub-beams 110-112, 140, and 213-219 may be used for a variety of purposes, such as communications or sensing operations.

FIG. 3 illustrates an example of the curved beam replicator 100 in a sensor system 300. In addition to the curved beam replicator 100, the sensor system 300 includes a plurality of beam detectors 310-320 around the curved beam replicators 100, an optical signal generator 304 (e.g., a laser device), and a computing device 330 coupled to beam detectors 310-320. The computing device 330 may also be coupled to the optical signal generator 304, or the optical signal generator 304 may be controlled separately (e.g., manually or by a different computing device, not shown).

Figure 5:
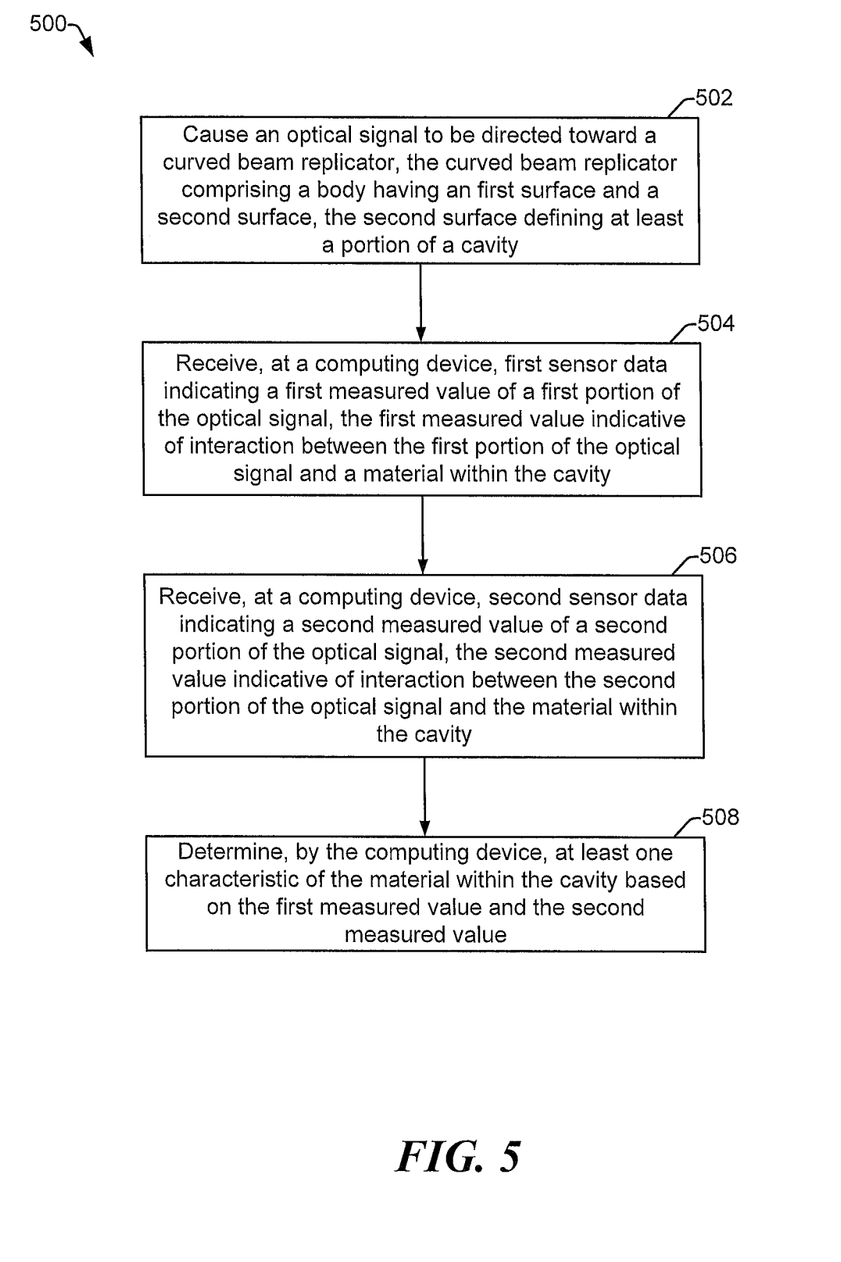
FIG. 5 is a flow chart illustrating a particular example of a method for determining at least one characteristic of a material within a cavity using the curved beam replicator of FIG. 1.

In FIG. 3, the body 102 of the curved beam replicator 100 forms a complete ring; however, as explained with reference to FIG. 1, in other examples, the body 102 of the curved beam replicator 100 does not form a complete ring. The second surface 106 defines at least a portion of a cavity 302. A medium to be sensed may be contained within or passed through the cavity 302 such that the multiple sub-beams pass through the medium. In a particular example, the curved beam replicator 100 at least partially surrounds a pipe or tube (as shown in FIGS. 4 and 5). In this example, the sub-beams 110-112, 140, 213-219 pass through a fluid flowing through the pipe or tube, and the beam detectors 310-320 detect changes in the sub-beams 110-112, 140, 213-219 caused by interaction with the fluid.

For example, FIG. 3 illustrates a particle 370 within the cavity 302. Due to its position within the cavity 302, the particle 370 is interacting with the sub-beams 111 and 215. Interaction of the particle 370 with the sub-beams 111 and 215 is detectable by the beam detectors 311 and 316 as a change in intensity, wavelength, dispersion, pointing location, or a combination thereof, of the sub-beam 111, 215. Thus, based on changes in the sub-beams 111 and 215, the sensor system 300 can determine a location of the particle 370 within the cavity 302.

In some implementations, other properties of the particle 370 can also be detected based on interaction of the particle with one or more the sub-beams 110-112, 140, 213-219. For example, an approximate size of the particle 370 can be determined based on a number of sub-beam the particle 370 interacts with at a particular time. As another example, if an approximate size of the particle is known, a rate of movement of the particle 370 (and by implication a rate of movement a fluid bearing the particle 370) can be estimated based on a duration of interaction between the particle 370 and one or more of the sub-beams 110-112, 140, 213-219. As another example, certain chemical or material properties of the particle 370 may be determined based on a wavelength of light absorbed by (or more strongly absorbed by) the particle 370. In this example, the optical signal generator 304 may be a broad spectrum source that emits light over a range of wavelengths. In an alternative example, the sensor system 300 includes one or more additional optical signal sources and corresponding beam sensors. In this example, the optical signal sources may generate light at different wavelengths or in different wavelength ranges to facilitate detection of absorption characteristics of the particle 370.

The particle 370 illustrated in FIG. 3 is merely one example of a feature with the cavity 302 that can be detected based on interaction with the sub-beams 110-112, 140, 213-219. In another example, the cavity 302 includes multiple chemical species, at least one of which interacts with the sub-beams 110-112, 140, 213-219 in an optically detectable manner. In this example, an approximate concentration of the chemical constituent that interacts with the sub-beams 110-112, 140, 213-219 can be estimated by based on light detected by the beam detectors 310-320. The optically detectable chemical constituent can include reactants, reaction products, reaction byproducts, contaminants, or catalysts. As yet another example, in some implementations, flow disturbances or a flow regime of a fluid flowing through the cavity 302 can be detected. For example, in some implementations, turbulent flow or cavitation within the cavity 302 can be detected based on differences in beam distribution or beam intensity at multiple beam detectors 310-320.

The computing device 330 is coupled to the beam detectors 310-320 via a sensor interface 338. The computing device 330 includes one or more processors (e.g., a processor 332) and memory 334 (e.g., one or more non-transitory processor-readable storage devices) accessible to the one or more processors. The memory 334 includes instructions 340 executable by the processor 332. The memory 334 may also store sensor data 342 received from the beam detectors 310-320, calibration data 344, detection result data 346, other data (not shown), or a combination thereof.

In a particular implementation, the instructions 340 are executable by the processor 332 to process the sensor data 342 to generate the detection result data 346. The sensor data 342 includes values of measurements received from the beam detectors 310-320. The measurements include beam intensity, a beam wavelength, a beam dispersion or distribution across a detection region of the beam detector, a location of a beam spot on the beam detector, other measurements, or a combination thereof. Expected measurement values corresponding of various conditions may be determined based on the calibration data 344. For example, the calibration data 344 may include, for each sub-beam/beam detector pair, expected measurement values (e.g., a beam intensity, a beam wavelength, a beam dispersion, beam spot location, or a combination thereof) corresponding to no interaction between the sub-beam and the particle 370. The calibration data 344 may also include, for each sub-beam/beam detector pair, one or more expected measurement values corresponding to interaction between the sub-beam and a particle have particular characteristics (e.g., size, movement rate, or chemical or material properties). Thus, by comparing measured values from the beam detectors 310-320 to the calibration data 344, the processor 332 (executing the instructions 340) can determine characteristics of the fluid flowing in the cavity 302 and store values based on the determined characteristics in the memory 334 as the detection result data 346.

In a particular implementation, the processor 332 (executing the instructions 340) is configured to generate an output based on the detection result data 346. As illustrated in FIG. 3, the output is provided to an output device 352. The output can include a periodic or continuous indication of one or more specific values, such as a measured or estimate sized of the particle 370. Alternatively or in addition, the output can include an indication that a measured or estimated value satisfies threshold. For example, the threshold may include particle size alarm threshold, and the output may be sent to the output device 352 based on determining that the particle 370 is larger than the particle size alarm threshold. As another example, the threshold may include a reactant concentration alarm threshold, and the output may be sent to the output device 352 based on determining the reactant concentration is less than the alarm threshold.

In some implementations, the computing device 330 includes a control interface 336 configured to communicate with (e.g., send control signals to) the optical signal generator 304, one or more controlled systems (such as, a controlled system 350), or both. In a particular implementation, the computing device 330 sends control signals to the controlled system 350 based on the detection result data 346. To illustrate, when the detection result data 346 indicates that a concentration of a particular material (e.g., a reactant or a catalyst) fails to satisfy a threshold (e.g., is greater than an upper control bound, or is less than a lower control bound), the computing device 330 may send control signals to the controlled system 350 to adjust a feed rate of the particular material.

Although the beam detectors 310-320 are illustrated in FIG. 3 as discrete components positioned some distance from the curved beam replicator 100, this is merely one example. In other implementations, the beam detectors 310-320 contact or nearly contact the first surface 104 of the curved beam replicator 100. Additionally or in the alternative, in some implementations, multiple beam detectors 310-320 may be integrated in a signal device, such as a charge-coupled device (CCD) or a complementary metal-oxide-semiconductors (CMOS) device, including a plurality of pixels, with a first sub-set of the pixels corresponding to a first beam detector and a second sub-set of the pixels corresponding to a second beam detector. Further, although the beam detectors 310-320 are illustrated in FIG. 3 in positions that encircle the curved beam replicator 100, in other implementations, the body 102 of the curved beam replicator 100 forms only a portion of a ring (e.g., a first half of a ring bounding the cavity 302), and beam detectors are positions in locations corresponding to another portion of the ring (e.g., the second half of the ring). In such implementations, sub-beams from the first half ring pass through the cavity (and material disposed within or flowing through the cavity) and are detected on the other side of the cavity by the beam detectors.

FIG. 4 illustrates a particular example of a system 400 including the curved beam replicator 100 positioned around a tube 402. In FIG. 4, the system 400 also includes the optical signal generator 304 and multiple beam detectors 318-320 coupled to or position proximate to the curved beam replicator 100. Although three beam detectors 318-320 are illustrated in FIG. 4, in other examples, the system 400 includes more than three beam detectors or fewer than three beam detectors. The beam detectors 318-320 are coupled to or in communication with (e.g., via wireless signals) the computing device 330 of FIG. 3.

At least a portion of the tube 402 directly adjacent to (e.g., under) the curved beam replicator 100 is substantially transparent to the beam 108. In FIG. 4, other portions of the tube 402 are covered by a protective coating 404. The protective coating 404 may be transparent or opaque to the beam 108.

In FIG. 4, a fluid 410 flows through the tube 402. As explained above, interaction of sub-beams generated by the curved beam replicator 100 and the fluid 410 or material carried through the tube 402 by the fluid 410 (such as the particle 370) can be detected and measured by the beam detectors 318-320. Thus, in the example illustrated in FIG. 4, the system 400 illustrates a non-contact sensor system to continuously, periodically, or occasionally generated detection result data 346 based on optically detectable interactions between sub-beams of the beam 108 and the fluid 410 or material in the fluid 410.

FIG. 5 is flow chart illustrating a particular example of a method 500 for determining a characteristic of a material within a cavity using the curved beam replicator 100 of FIG. 1. In a particular implementation, the method 500 is performed by the computing device 330 of FIG. 3.

The method 500 includes, at 502, causing an optical signal to be directed toward a curved beam replicator, such as the curved beam replicator 100 of FIGS. 1-4. As explained above, the curved beam replicator 100 includes a body 102 having a first surface 104 and a second surface 106. The second surface 106 defining at least a portion of a cavity 302. The body 102 is configured to divide the optical signal (e.g., the beam 108) into multiple portions (e.g., a set of "sub-beams", such as the sub-beams 110-112, 140, and 213-219) at 402. In a particular implementation, the computing device 330 causes the optical signal to be directed toward the curved beam replicator 100 by sending a control signal, via the control interface 336, to the optical signal generator 304. In response to the control signal, the optical signal generator 304 directs the beam 108 or another optical signal toward the curved beam replicator 100.

The method 500 also includes, at 504, receiving, at the computing device, first sensor data indicating a first measured value of a first portion of the optical signal. The first measured value is indicative of interaction between the first portion of the optical signal and a material within the cavity. In a particular implementation, the first sensor data is received at the computing device 330 from one of the beam detectors 310-320. For example, the first portion of the optical signal may correspond to the first sub-beam 110, in which case the first measured value may include sensor data from the beam detector 310. In this example, a value of the sensor data depends on interaction of the first sub-beam 110 with material in the cavity 302, such as the particle 370 or a fluid in the cavity 302. To illustrate, if the first sub-beam 110 strikes the particle 370 at a first time, the particle 370 may partially obscure or scatter the first sub-bream, resulting in a decrease in beam intensity of the first sub-bream 110 as measured by the beam detector 310. As another example, if the first sub-beam 110 includes multiple wavelengths of light over a wavelength range, and if a chemical constituent of a fluid in the cavity 302 absorbs a particular wavelength within the wavelength range, an intensity of light having the particular wavelength detected by the beam detector 310 is indicative of a concentration of the chemical constituent in the cavity 302.

The method 500 also includes, at 506, receiving, at the computing device, second sensor data indicating a second measured value of a second portion of the optical signal. The second measured value indicative of interaction between the second portion of the optical signal and the material within the cavity. In a particular implementation, the second sensor data is received at the computing device 330 from another one of the beam detectors 310-320. For example, the second portion of the optical signal may correspond to the second sub-beam 111, in which case the second measured value may include sensor data from the beam detector 311. In this example, a value of the sensor data depends on interaction of the second sub-beam 111 with material in the cavity 302, such as the particle 370 or a fluid in the cavity 302. Further, since the first sub-beam 110 and the second sub-beam 111 take different paths through the cavity 302, differences between the measured values indicate where particular materials are present in the cavity.

The method 500 also includes, at 508, determining, by the computing device, at least one characteristic of the material within the cavity based on the first measured value and the second measured value. For example, by monitoring the measured values over time, changes in concentration of particular materials within the cavity can be identified. As another example, a flow regime or flow rate of a fluid in the cavity can be estimated based on the measured values, as explained above.

Figure 6:
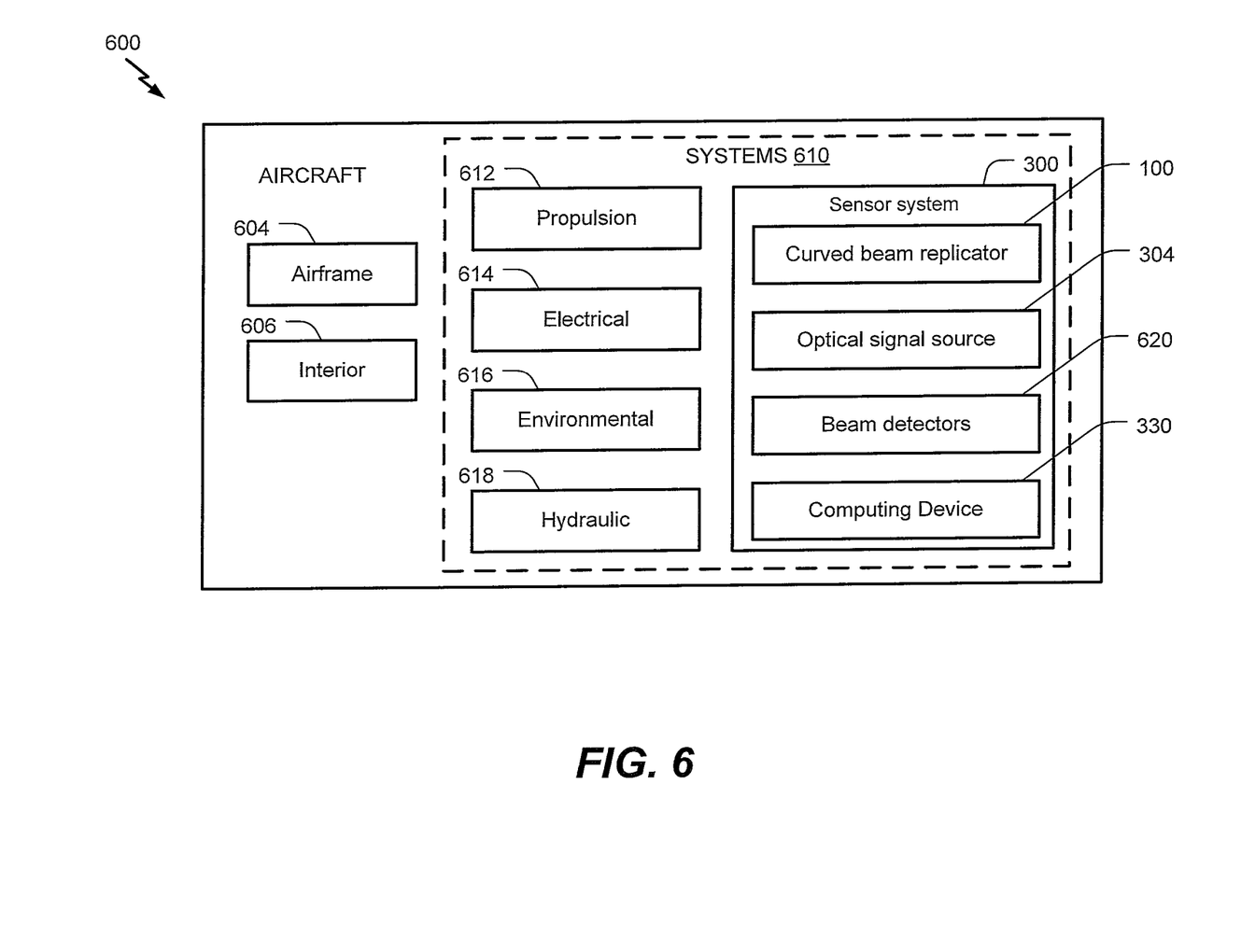
FIG. 6 is a block diagram illustrating an example of an aircraft that includes the curved beam replicator of FIG. 1.

Referring to FIG. 6, a block diagram of an illustrative embodiment of an aircraft 600 that includes the sensor system 300 is shown. In FIG. 6, the sensor system includes the curved beam replicator 100, the optical signal source 304, a plurality of beam detectors 620 (such as the beam detectors 310-320 of FIG. 3), and the computing device 330. As shown in FIG. 6, the aircraft 600 includes an airframe 604, an interior 606, and a plurality of system 610. In FIG. 6, the systems 610 include a propulsion system 612 (e.g., one or more engines), an electrical system 614, an environmental system 616, and a hydraulic system 618. Many of the systems 610 use one or more working fluids that can be monitored using the sensor system 300. For example, the propulsion system 612 may receive fuel from a fuel source and combust the fuel to generate a moving airstream to provide thrust. In this example, the sensor system 300 can be used to monitor fuel flow or fuel contaminants as the fuel flows to an engine. Alternatively or addition, the sensor system 300 can monitor combustion byproducts in the moving airstream.

As another example, the hydraulic system 618 generates and transfers force by applying pressure to a fluid (e.g., hydraulic fluid). In this example, the sensor system 300 can monitor contaminants with the hydraulic fluid, such as gas bubbles or metallic flakes.

As yet another example, the environmental system 616 moves air or other gases (e.g., oxygen) to control temperature and comfort of passengers. In the above examples, the sensor system 300 can monitor the flow of the air or other gases to detect contaminants, such as smoke or other particulates.

Although FIG. 6 illustrates a specific implementation of the sensor system 300 in an aircraft 600, the sensor system 300 can be integrated into any vehicle or fixed structure to monitor a fluid as described above. For example, the sensor system 300 may be integrated with a surface ship or boat, a submarine, a land vehicle, space vehicle, or a stationary facility, such as a chemical plant or oil refinery.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A curved beam replicator comprising:
a body having a first surface with a first radius of curvature and a second surface with a second radius of curvature, the second surface defining a cavity, wherein the second surface has varying reflective properties across the second surface,
wherein the first surface is configured to cause light entering the body from another medium to be refracted at a first angle such that the light strikes the second surface at a second angle,
wherein the second surface is structurally configured to cause a first portion of the light striking the second surface to pass through the second surface and to be refracted into a medium in the cavity and to cause a second portion of the light striking the second surface to be reflected toward the first surface at a third angle, the third angle such that the second portion of the light is totally internally reflected by the first surface, and
wherein the first portion of the light is angled to pass through the second surface and the first surface after passing through the medium in the cavity.

2. The curved beam replicator of claim 1, wherein the first surface is further configured to cause the second portion of the light to be total internally reflected at a fourth angle such that the second portion of the light strikes the second surface at a fifth angle, and wherein the second surface is further configured to cause a third portion of the light striking the second surface at the fifth angle to pass through the second surface and to be refracted into the medium in the cavity, and to cause a fourth portion of the light striking the second surface at the fifth angle to be reflected toward the first surface at a sixth angle, the sixth angle such that the fourth portion of the light is totally internally reflected by the first surface.

3. The curved beam replicator of claim 2, wherein the body forms a complete ring.

4. A curved beam replicator comprising:
a body having a first surface and a second surface, the second surface defining at least a portion of a cavity; and
a protective coating attached to portions of the first surface, the protective coating defining translucent portions of the first surface;
wherein the first surface is configured to cause light entering the body from another medium to be refracted at a first angle such that the light strikes the second surface at a second angle, and
wherein the second surface is configured to cause a first portion of the light striking the second surface to pass through the second surface and to be refracted into a medium in the cavity and to cause a second portion of the light striking the second surface to be reflected toward the first surface at a third angle, the third angle such that the second portion of the light is totally internally reflected by the first surface, wherein the body is configured to cause the light that strikes the second surface at the second angle to strike a first region of the second surface, the first region having first reflective properties, and wherein the body is configured to cause the portion of the light that strikes the second surface at the fifth angle to strike a second region of the second surface, the second region having second reflective properties different from the first reflective properties.

5. The curved beam replicator of claim 4, wherein the first reflective properties and the second reflective properties are such that an intensity of the first portion of the light is approximately equal to an intensity of the third portion of the light.

6. The curved beam replicator of claim 4, further comprising a layer of reflective material coupled to the second surface including the first region of the second surface and the second region of the second surface, wherein a quantity of the reflective material is different at the first region of the second surface than at the second region of the second surface.

7. A system comprising:
a curved beam replicator comprising a body having a first surface and a second surface, the second surface defining at least a portion of a cavity;
an optical signal generator configured to direct an optical signal toward the curved beam replicator, wherein the optical signal passes through the first surface at a particular refraction angle, wherein a first portion of the optical signal passes through a first region of the second surface at a second particular refraction angle into the cavity, and wherein a second portion of the optical signal reflects from the first region of the second surface at a particular incidence angle, wherein a third portion of the second portion passes through a second region of the second surface at a third particular refraction angle into the cavity;
a plurality of beam detectors, the plurality of beam detectors including:
a first beam detector positioned to detect the first portion of the optical signal; and
a second beam detector positioned to detect the third portion that passes through the cavity; and
a processor configured to:
receive first sensor data from the first beam detector indicating a first measured value of the first portion of the optical signal, the first measured value indicative of interaction between the first portion of the optical signal and a material within the cavity;

receive second sensor data from the second beam detector indicating a second measured value of the third portion of the optical signal, the second measured value indicative of interaction between the second third portion of the optical signal and the material within the cavity; and determine at least one characteristic of the material within the cavity based on the first measured value and the second measured value.

8. The system of claim 7, wherein a third beam detector of the plurality of beam detectors is positioned to detect a fourth portion of the optical signal that passes through a third region of the second surface by passing through a third region of the second surface at a fourth particular refraction angle into and through the cavity.

9. The system of claim 7, wherein the processor is communicatively coupled to the plurality of beam detectors.

10. The system of claim 7, wherein the processor is configured to cause a control signal to be sent to a controlled system based on the at least one characteristic of the material.

11. The system of claim 7, wherein processor is configured to detect, based on the first sensor data and the second sensor data, a reactant, a reaction product, a reaction byproduct, a contaminant, or a catalyst in the material.

12. The system of claim 7, wherein the processor is configured to determine a location of the material within the cavity based on the first measured value and the second measured value.

13. The system of claim 7, wherein the processor is configured to determine an estimate of a size of a portion of the material within the cavity based on the first measured value and the second measured value.

14. The system of claim 7, further comprising a memory storing calibration data, wherein the processor is coupled to the memory, the processor configured to determine the at least one characteristic of the material by comparing the first sensor data and the second sensor data to the calibration data.

15. The system of claim 7, wherein the body of the curved beam replicator forms a complete ring around a tube configured to transport a fluid bearing the material.

16. The system of claim 7, wherein the first surface of the curved beam replicator is configured to cause light of the optical signal entering the body from another medium to be refracted at a first angle such that the light strikes the second surface at a second angle, and the second surface of the curved beam replicator is configured to cause a first portion of the light striking the second surface to pass through the second surface and be refracted into a medium in the cavity as the first portion of the optical signal, and to cause a second portion of the light striking the second surface to be reflected toward the first surface at a third angle, the third angle such that the second portion of the light is totally internally reflected by the first surface at a fourth angle such that the second portion of the light strikes the second surface at a fifth angle, and wherein the second surface is further configured to cause a third portion of the light striking the second surface at the fifth angle to pass through the second surface and be refracted into the medium in the cavity as the second portion of the optical signal.

17. A method comprising:

causing an optical signal to be directed toward a curved beam replicator, the curved beam replicator comprising a body having a first surface and a second surface, the second surface defining at least a portion of a cavity, the body configured to divide the optical signal into multiple portions;

receiving, at a computing device, first sensor data indicating a first measured value of a first portion of the optical signal, the first measured value indicative of interaction between the first portion of the optical signal and a material within the cavity;

receiving, at the computing device, second sensor data indicating a second measured value of a second portion of the optical signal, the second measured value indicative of interaction between the second portion of the optical signal and the material within the cavity; and determining, by the computing device, at least one characteristic of the material within the cavity based on the first measured value and the second measured value.

18. The method of claim 17, wherein at least one characteristic of the material within the cavity includes at least one of a size of a particle, a rate of movement of the particle, a chemical constituent of a fluid, a flow rate of the fluid, a flow regime of the fluid, or a flow disturbance of the fluid.

19. The method of claim 17, wherein the first measure value indicates an intensity of the first portion of the optical signal and the second measure value indicates an intensity of the second portion of the optical signal.

20. The method of claim 17, wherein determining at least one characteristic of the material within the cavity includes comparing the first measured value to calibration data associated with a first beam detector and comparing the second measured value to calibration data associated with a second beam detector.

* * * * *

UNITED STATES PATENT AND TRADEMARK OFFICE
CERTIFICATE OF CORRECTION

PATENT NO. : 10,901,228 B2
APPLICATION NO. : 15/635101
DATED : January 26, 2021
INVENTOR(S) : Keith Daniel Humfeld and Morteza Safai It is certified that error appears in the above-identified patent and that said Letters Patent is hereby corrected as shown below:

In the Claims

Column 13, Line 5, Claim 7, delete "second".

Signed and Sealed this
Ninth Day of March, 2021

Drew Hirshfeld
*Performing the Functions and Duties of the
Under Secretary of Commerce for Intellectual Property and
Director of the United States Patent and Trademark Office*